United States Patent
Yuan

(10) Patent No.: US 8,913,564 B2
(45) Date of Patent: Dec. 16, 2014

(54) METHOD AND SYSTEM FOR DYNAMIC BANDWIDTH ALLOCATION BETWEEN NETWORKS

(75) Inventor: Hao Yuan, Beijing (CN)

(73) Assignee: Intel Corporation, Santa Clara, CA (US)

( * ) Notice: Subject to any disclaimer, the term of this patent is extended or adjusted under 35 U.S.C. 154(b) by 1446 days.

(21) Appl. No.: 12/570,248

(22) Filed: Sep. 30, 2009

(65) Prior Publication Data

US 2011/0075613 A1  Mar. 31, 2011

(51) Int. Cl.
| | |
|---|---|
| *H04W 4/00* | (2009.01) |
| *H04L 12/28* | (2006.01) |
| *H04J 3/16* | (2006.01) |
| *H04W 72/12* | (2009.01) |
| *H04W 84/12* | (2009.01) |
| *H04W 88/06* | (2009.01) |
| *H04W 88/10* | (2009.01) |
| *H04W 28/16* | (2009.01) |
| *H04W 28/20* | (2009.01) |
| *H04W 36/08* | (2009.01) |

(52) U.S. Cl.
CPC .......... *H04W 72/1215* (2013.01); *H04W 84/12* (2013.01); *H04W 88/06* (2013.01); *H04W 88/10* (2013.01); *H04W 28/16* (2013.01); *H04W 28/20* (2013.01); *H04W 72/1284* (2013.01); *H04W 36/08* (2013.01)
USPC ............ 370/329; 370/341; 370/431; 370/437

(58) Field of Classification Search
CPC ...................................................... H04W 72/04
USPC .......... 370/329, 341, 431, 437; 455/450, 452, 455/464, 509
See application file for complete search history.

(56) References Cited

U.S. PATENT DOCUMENTS

| | | | | |
|---|---|---|---|---|
| 7,688,849 | B2 * | 3/2010 | Rabie et al. .................... | 370/466 |
| 2003/0187934 | A1 * | 10/2003 | Nishikawa et al. ............ | 709/206 |
| 2005/0197148 | A1 * | 9/2005 | Ali et al. ......................... | 455/522 |
| 2007/0010261 | A1 * | 1/2007 | Dravida et al. ............. | 455/456.3 |
| 2007/0066359 | A1 * | 3/2007 | Zhuang ......................... | 455/557 |
| 2007/0281710 | A1 * | 12/2007 | Bai et al. ..................... | 455/452.1 |
| 2008/0267110 | A1 * | 10/2008 | Cai et al. ........................ | 370/315 |
| 2009/0074007 | A1 * | 3/2009 | Yonge et al. .................. | 370/468 |
| 2010/0165962 | A1 * | 7/2010 | Tzoreff et al. ................. | 370/338 |

OTHER PUBLICATIONS

IEEE Standard for Information technology—Telecommunications and information exchange between systems—Local and metropolitan area networks—Specific requirements Part 11: Wireless LAN Medium Access Control (MAC) and Physical Layer (PHY) Specifications, IEEE Std 802.11™-2007 (Revision of IEEE Std 802.11-1999 ).

\* cited by examiner

*Primary Examiner* — Brandon Renner
*Assistant Examiner* — Abdelnabi Musa
(74) *Attorney, Agent, or Firm* — Shichrur & Co.

(57) ABSTRACT

A method and system for a communication device having a network interface card (NIC) for communicating with two networks to dynamically allocate bandwidth between or among the networks.

15 Claims, 2 Drawing Sheets

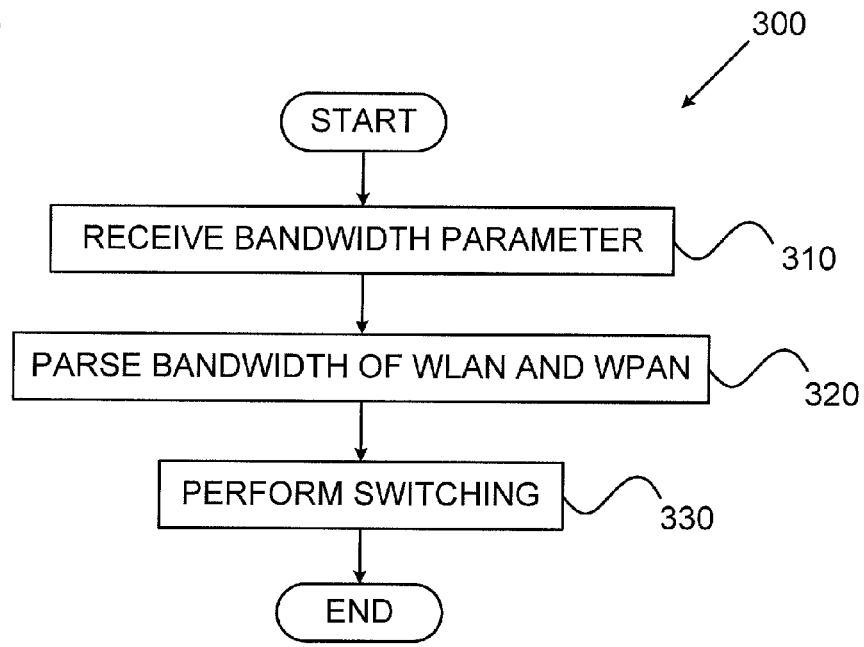
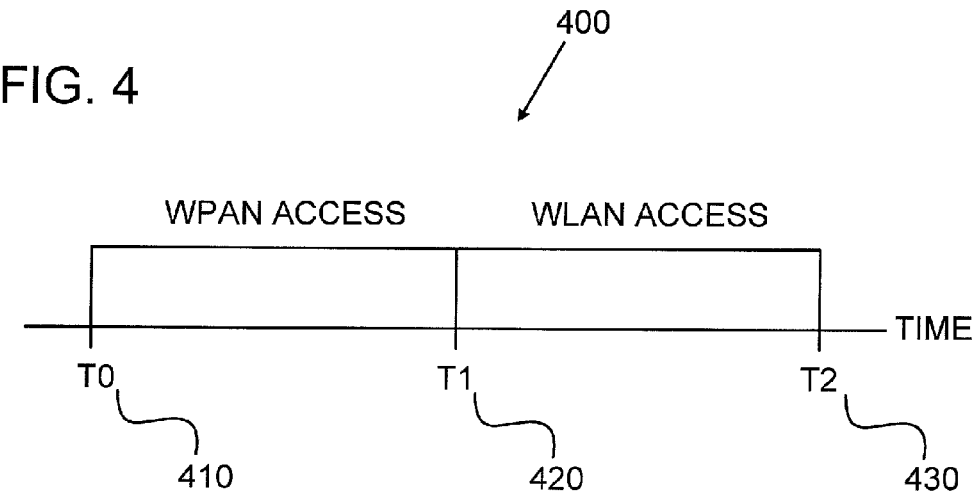

US 8,913,564 B2

METHOD AND SYSTEM FOR DYNAMIC BANDWIDTH ALLOCATION BETWEEN NETWORKS

FIELD OF THE INVENTION

The present invention relates to network interfaces, and in particular to dynamic allocation of bandwidth between a device with a network interface card and two or more networks.

BACKGROUND OF THE INVENTION

A wireless network adapter (WNA) may be used to facilitate communication between a computing device and a network, and may function as a station (STA), which may be, for example, a network access point. A WNA may be a dual connection device, for example a WNA that may include an implementation of dual access technology, e.g. Cliffside, and may connect to two networks from an individual access point, and may use, for example Time Division Multiplexing (TDM). A WNA implementing this, or similar, technology may enable a single WNA to behave as, for example two independent WNAs, and a functioning of each may be for a predetermined and static bandwidth. Each of these functional WNAs may communicate over a network using a standard communication protocol, e.g. Bluetooth or IEEE 802.11 protocols, each network may be connected by a different communication protocol. A WNA that may implement dual access technology may act as, for example, a STA on one network and an Access Point (AP) on another network, and may perform both functions virtually simultaneously by using fixed time slots from a allocation method, e.g. TDM. Multiple devices may connect to a WNA connected on either network, and there may be a plurality of bandwidth demands, each limited in available communication bandwidth by an allocated bandwidth from a WNA.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 3 depicts a method of dynamic bandwidth allocation according to embodiments of the present invention; and FIG. 4 depicts an exemplary graph of a function according to embodiments of the present invention.

Figure 1:
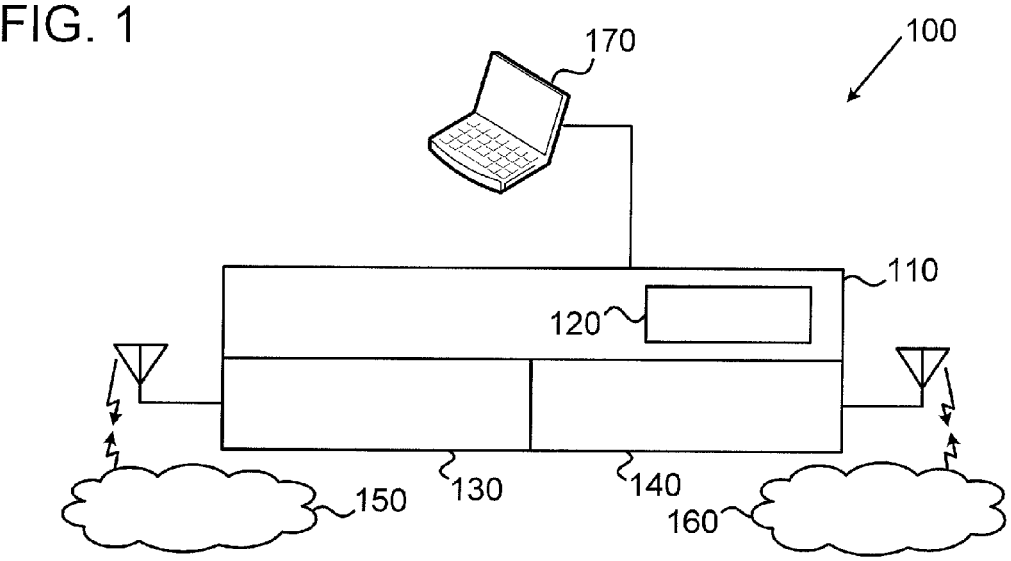
FIG. 1 depicts an exemplary block diagram illustrating an embodiment of a system according to embodiments of the present invention.

Embodiments of the invention are illustrated by way of example and not limitation in the figures of the accompanying drawings, in which like reference numerals indicate corresponding, analogous or similar elements. It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DESCRIPTION OF EMBODIMENTS OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Embodiments of the invention may be used in a variety of applications. Some embodiments of the invention may be used in conjunction with various devices and systems, for example, a transmitter, a receiver, a transceiver, a transmitter-receiver, a wireless communication station, a wireless communication device, a wireless Access Point (AP), a modem, a wireless modem, a Personal Computer (PC), a desktop computer, a mobile computer, a laptop computer, a notebook computer, a tablet computer, a netbook computer, a server computer, a handheld computer, a handheld device, a Personal Digital Assistant (PDA) device, a handheld PDA device, a network, a wireless network, a Local Area Network (LAN), a Wireless LAN (WLAN), a Metropolitan Area Network (MAN), a wireless MAN (WMAN), a Wide Area Network (WAN), a Wireless WAN (WWAN), a Personal Area Network (PAN), a Wireless PAN (WPAN), devices and/or networks operating in accordance with existing IEEE 802.11, 802.11a, 802.11b, 802.11e, 802.11g, 802.11h, 802.11i, 802.11n, 802.1x, 802.16, 802.16d, 802.16e standards and/or future versions and/or derivatives and/or Long Term Evolution (LTE) of the above standards, a Personal Area Network (PAN), a Wireless PAN (WPAN), units and/or devices which may be part of the above WLAN and/or PAN and/or WPAN networks, one-way and/or two-way radio communication systems, cellular radio-telephone communication systems, a cellular telephone, a wireless telephone, a Personal Communications Systems (PCS) device, a PDA device which may incorporate a wireless communication device, a Multiple Input Multiple Output (MIMO) transceiver or device, a Single Input Multiple Output (SIMO) transceiver or device, a Multiple Input Single Output (MISO) transceiver or device, a Multi Receiver Chain (MRC) transceiver or device, a transceiver or device having "smart antenna" technology or multiple antenna technology, or the like. Some embodiments of the invention may be used in conjunction with one or more types of wireless communication signals and/or systems, for example Radio Frequency (RF), Infra Red (IR), Frequency-Division Multiplexing (FDM), Orthogonal FDM (OFDM) Time-Division Multiplexing (TDM), Time Division Multiple Access (TDMA), Extended TDMA (E-TDMA), General Packet Radio Service (GPRS), Extended GPRS, Code-Division Multiple Access (CDMA), Wideband CDMA (WCDMA), CDMA 2000, Multi-Carrier Modulation (MCM), Discrete Multi-Tone (DMT), Bluetooth®, ZigBee™, or the like. Embodiments of the invention may be used in various other apparatuses, devices systems and/or networks.

Although embodiments of the invention are not limited in this regard, discussions utilizing terms such as, for example, "processing," "computing," "calculating," "determining," "establishing," "analyzing," "checking," or the like, may refer to operation(s) and/or processes of a computer, a computing platform, a computing system, or other electronic computing device, that manipulate and/or transforms data represented as physical (e.g., electronic) quantities within the computer's registers and/or memories into other data similarly represented as physical quantities within the computer's registers and/or memories or other information storage medium that may store instructions to perform operations and/or processes.

Although embodiments of the invention are not limited in this regard, the terms "plurality" and "a plurality" as used herein may include, for example, "multiple" or "two or more." The terms "plurality" or "a plurality" may be used throughout the specification to describe two or more components, devices, elements, units, parameters, or the like. For example, "a plurality of stations" may include two or more stations.

Referring to FIG. 1, embodiments of the present invention may comprise a system 100 as schematically depicted.

A network 150 may be a wired or wireless network, but for simplicity may be referred to as a wireless personal area network (WPAN), which may connect and enable communication among a plurality of devices, for example, Personal Digital Assistants (PDA), cellular telephones, cameras, printers, access points, etc., and may use a common communication protocol, for example, an RF communication protocol, e.g. Bluetooth or Infrared Data Association (IrDA).

A network 160 may be a wired or wireless network, but for simplicity may be referred to as a wireless local area network (WLAN), which may connect and enable communication among a plurality of computing devices, for example, laptop, notebook and/or desktop computers, servers, access points, routers, etc., and may use a communication protocol, for example IEEE 802.11b or IEEE 802.11g. In some embodiments, a bandwidth of communication among devices connected within WLAN network 160 may be larger or smaller than a bandwidth of communication among devices connected within WPAN network 150.

A computing device, for example a notebook computer 170, may wish to be simultaneously connected to and communicate simultaneously with WPAN 150 and WLAN 160 by means of one or more communication channels, for example, a wired, wireless, or other channel. Computer 170 may comprise or be associated with a communication module, for example, a modem, antenna, etc. Computer 170 may further comprise or be associated with a processor for performing the bandwidth allocation methods described herein, including, for example, dynamic bandwidth allocation. Computer 170 may further comprise or be associated with a memory for storing thereon bandwidth parameters, as described below.

A network interface device may be, for example a Network Interface Card (NIC) 110, or a wireless network adapter, and may be within or connected to computer 170. For simplicity NIC will be referred to as connected to computer 170, however it will be understood that NIC may be within or comprise a part of computer 170, for example part of a processor and a memory within computer 170. A NIC 110 may comprise a plurality of access points for access to networks 150 and 160, and each may communicate using known communication protocols, such as IEEE 802.11 protocols, IEEE 802.16 protocols, an RF communication protocol, e.g. Bluetooth, or other protocols that may describe operation over short-haul interfaces, e.g. at or around 60 GHz. NIC 110 may implement a dual access technology, e.g. Cliffside technology, which may further implement a multiple access scheme, e.g. Time Division Multiplexing (TDM). A NIC 110 may comprise a memory and/or a processor for storing and computing parameters associated with transmission protocols. A NIC may comprise firmware 120, which may be stored in a memory, and may instruct a processor to perform specified calculations and/or functions that may be related to communication between computer 110 and networks 150 and 160. In some embodiments, firmware 120 may be within computer 170. In other embodiments, firmware 120 may be within NIC 110. Firmware 120 may be a program to control an operation of a NIC, e.g. a driver program, or may be a routine within another program that may be executed by or within computer 170 or NIC 110. Firmware may be specific to a NIC, or may be a general program. Firmware that may be specific to a MC may operate a NIC, for example, simultaneously as a regular STA for a WLAN and as a light AP for a WPAN.

A NIC 110 may further comprise a plurality of network communication access points. A network communication access point for communication with a WPAN may be a station, a base station, or an Access Point (AP) 130. AP 130 may use known communication protocols, e.g. Bluetooth, for communication among one or more devices that may be connected to network 150. A network communication access point for communication with a WLAN may be an access point or a Station (STA) 140. STA 140 may use known communication protocols, e.g. IEEE 802.11 protocols, for communication among one or more devices that may be connected to network 160. AP 130 and STA 140 may both communicate with computer 170 via a connection that may be provided by NIC 110. This connection may be managed by firmware 120, a control program, e.g. a driver, that may reside within computer 170, or both. Communication may be managed, for example by an access scheme, e.g. TDM, where AP 130 and STA 140 may each be assigned a time slot for communication with a corresponding network, and such assignment may be in accordance with a method described below. An assignment of a time slot may correlate with an available bandwidth that may be usable for communication between AP 130 and network 150, and for communication between STA 140 and network 160. Devices that may be connected to WPAN 150 and WLAN 160 may have varying bandwidth requests that may depend at least partly on a type of information that may be desired to be communicated across WPAN 150 and/or WLAN 160. This information may vary at different times, for example when a sending of a set of packets has been completed.

A NIC 110 may implement a protocol, for example an IEEE 802.11e protocol, in order to manage service quality on network links that may have been established. As part of such standard protocols a plurality of information may be exchanged between a network and an access point, and such information may be in a standard format. In an IEEE 802.11 protocol, for example, there may be an ADD Transmission Stream (ADDTS) request and a response to an ADDTS that may each be found in a frame, that may be in accordance with a standard protocol. Information that may form part or all of this standard protocol information may be used by a NIC to control access between computer 170 and networks 150 and 160. A NIC may operate simultaneously as a STA, e.g. a regular STA, for WLAN and as an AP, e.g. a light AP, for WPAN, and a technology, e.g. Cliffside technology, may be used to implement such operation.

Figure 2:
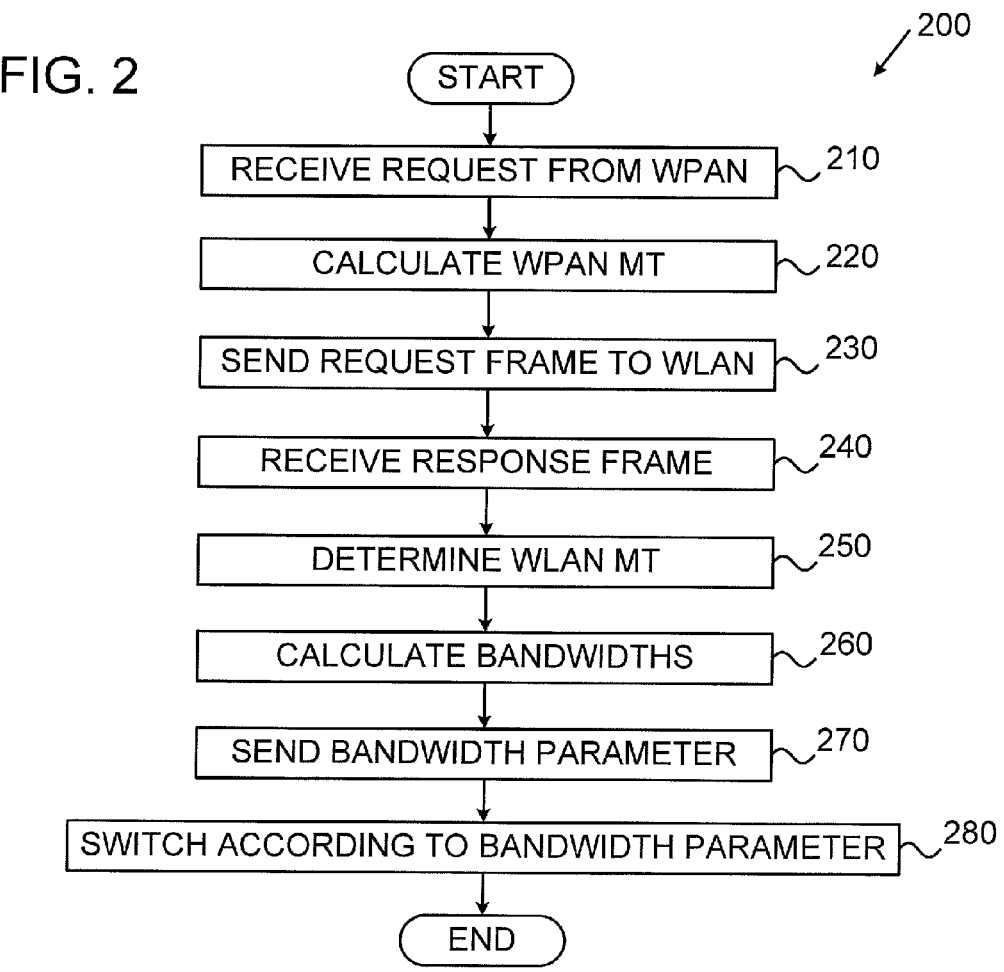
FIG. 2 depicts a method of dynamic bandwidth allocation according to embodiments of the present invention.

According to embodiments of the invention, bandwidth may be allocated to AP 130 for communication between computer 170 and network 150, and bandwidth may be allocated to STA 140 for communication between computer 170 and network 160, as depicted by the flow diagram of FIG. 2. In some embodiments, bandwidth may be allocated, for example, in a frequency domain or in a time domain. In a time domain, bandwidth allocation may refer to an allocation of a time period, for example, of a time slot of an access scheme, e.g. TDM. Bandwidth may refer to a total allocated time that may include a plurality of periods, for example, time slots of an access scheme that may be a standard access scheme, e.g. TDM. In a frequency domain, bandwidth allocation may refer to an allocation of one or more subcarriers, for example, of a frequency access scheme, e.g. FDM.

In an embodiment of the invention an AP 130 may receive a request for bandwidth (210) that may allow information transmission, for example traffic, between network 150 and computer 170. This traffic may be, for example, video, voice, data, etc. This traffic request may be in a form of an ADDTS request frame, and may be from a device that may be connected in network 150. This traffic request may be analyzed by firmware 120, a program, e.g. a driver, within computer 170, or both, and a calculation may be made (220) for determining a requirement of a time, for example a Medium Time (MT), to service this traffic. A calculation of a MT may be from parameters, for example a surplus bandwidth allowance, a packet per second (PPS) and a medium access control protocol data unit (MPDU) exchange (MPDUExchange), where MPDUExchange may refer to a duration for a transmission of a corresponding traffic stream, and a MPDUExchange time may refer to an amount of time that may be used to transmit a packet, e.g. a MPDU packet. An exemplary equation for a calculation of MT may be:

MT=Surplus Bandwidth Allowance*PPS*MPDUExchange Time.

Other parameters, for example Media Access Control (MAC) Service Data Unit (MSDU) size, minimum transmission physical layer rate (Minimum PHY Rate), mean data rate, etc., may also be used as a part of a calculation. Such parameters may be found from interpreting received frames of a standard communication protocol, e.g. IEEE 802.11e. An ADDTS request and response frame may be used to calculate a MT that may be associated with a WPAN. This MT may be associated with a request from one or more devices that may be connected within WPAN 150 and may be referred to as WPAN MT.

A request may be sent (230) to an access point STA 140 for a WLAN 160, and may be in a form of a request frame, for example an ADDTS request frame. This request may be in accordance with a standard communication protocol, and a frame may be part of such a request. A WLAN access point STA 140 may determine a traffic requirement between a computer 170 and a WLAN 160, and may send a response frame (240) that may provide information about this requirement. A response may be a frame and may be in accordance with a standard protocol, e.g. an IEEE 802.11 protocol. This traffic requirement may be analyzed and a determination may be made (250) about a requirement of time, for example a MT, to service this traffic. A calculation of a MT may be from parameters, for example a surplus bandwidth allowance, a packet per second (PPS) and a MPDUExchange, where MPDUExchange may refer to a duration for a transmission of a corresponding traffic stream. An exemplary equation for a calculation of MT may be: MT=Surplus Bandwidth Allowance*PPS*MPDUExchange Time. Other parameters, for example Media Access Control (MAC) Service Data Unit (MSDU) size, minimum transmission physical layer rate (Minimum PHY Rate), mean data rate, etc., may also be used as a part of a calculation. Such parameters may be found from interpreting received frames of a standard communication protocol, e.g. IEEE 802.11e. An ADDTS request and response frame may be used to calculate a MT that may be associated with a WLAN. This MT may be associated with a request from one or more devices that may be connected within WLAN 160 and may be referred to as WLAN MT.

A calculation may be performed (260) to determine a bandwidth requirement for operation between AP 130 and WPAN 150, and for operation between STA 140 and WLAN 160. This calculation may be performed by firmware 120, by a program, for example a software program, that may be within computer 170, or a combination of both. A software program that may be within computer 170 may be a program to control an operation of a NIC, e.g. a driver program, or may be a routine within another program that may be executed by or within computer 170. A driver program may be specific to a NIC, or may be a general program. A driver that may be specific to a NIC may operate a NIC, for example, simultaneously as a regular STA for a WLAN and as a light AP for a WPAN.

In some embodiments, a calculation that may be performed (260) may use both WPAN MT and WLAN MT as inputs. Other input parameters, for example parameters that may be available as part of a standard protocol, may also be used by this calculation. A result of this calculation may be a bandwidth parameter that may be used to allocate an available bandwidth, for example that may be available from implementation of a standard protocol, among access between WPAN 150 and WLAN 160 and computer 170. This calculation may be part of an algorithm that may choose a bandwidth of communication with a WPAN and a WLAN, and this algorithm may be based in some part on an MT that may be associated with a WPAN, e.g. WPAN MT, and an MT that may be associated with a WLAN, e.g. WLAN MT. A bandwidth parameter that may be calculated may be used to implement dynamic bandwidth allocation between a WPAN and a WLAN, and may be according to different types of traffic that may be carried by each of the networks. A bandwidth that may be allocated to a WPAN and a bandwidth that may be allocated to a WLAN may add to a total bandwidth that may be allowed by a standard communication protocol. This total allowable bandwidth may be referred to as a beacon interval. A bandwidth that may be allocated to a WPAN may be a bandwidth allocated to a WLAN subtracted from a beacon interval, and a bandwidth that may be allocated to a WLAN may be a bandwidth allocated to a WPAN subtracted from a beacon interval. In some embodiments, if a total bandwidth calculated from WPAN MT and WLAN MT may exceed or be equal to a beacon interval, a full requested bandwidth may be allocated to a STA 140 that may connect to a WLAN 160, and a remaining bandwidth may be allocated to an AP 130 that may connect to a WPAN 150. If a total bandwidth calculated from WPAN MT and WLAN MT may be less than a beacon interval, a full requested bandwidth may be allocated to an AP 130 that may connect to a WPAN 150, and a remaining bandwidth may be allocated to a STA 140 that may connect to a WLAN 160.

A bandwidth parameter may be sent (270) to firmware 120 of NIC 110. NIC 110 may implement a bandwidth allocation, for example a dynamic bandwidth allocation, that may be based on this bandwidth parameter. For simplicity a bandwidth parameter may be referred to as a single parameter, however it may be understood that this parameter may be comprised of a plurality of parameters. A bandwidth parameter may be in a form of a command, and may be sent, for example, from a driver, e.g. a Cliffside driver, that may be within computer 170 to a firmware 120 that may be in a NIC 110, e.g. a Cliffside NIC. A NIC 110 may switch traffic to and from computer 170 among WPAN 150 and WLAN 160 according to a bandwidth parameter (280) and associated commands, and this traffic may be transmitted and/or received in accordance with a standard communication protocol. Switching may be by assigning, for example a time slot during a multiple access scheme, e.g. TDM. Traffic between computer 170 and WPAN 150 may be assigned a time slot, and traffic between computer 170 and WLAN 160 may be assigned another time slot, where a time equivalent to a sum of such times may be in accordance to a time allocation of a standard protocol. Such a sum may include additional elements, e.g. guard times and/or guard bands. A time slot may be assigned to a communication between a computing device 170 and a WLAN 160, and a subsequent time slot may be assigned to a communication between a computing device 170 and a WPAN 150, or communications may be interleaved between the two. Such communications may be in a form of packets.

In some embodiments of the invention a request for bandwidth (210) may be received at STA 140. A WLAN MT may be calculated (220), a frame request may be sent from AP 130 (230), a response may be received at AP 130 (240), and a WPAN MT may be determined (250). Bandwidth calculation, parameter sending and switching may follow substantially as described above, for steps (260), (270) and (280).

In some embodiments of the invention, an operation of a NIC 110 may be further explained by reference to FIG. 3. A driver that may be associated with a NIC 110 may process an ADDTS request and response frame, determine a WPAN MT and a WLAN MT, and determine a bandwidth parameter, substantially as described above. This bandwidth parameter may be sent from a driver and received by a firmware 120 (310) that may be associated with a NIC 110. A firmware 120 may parse an available bandwidth (320), and may do so in accordance with a received bandwidth parameter. Bandwidth may be parsed among a WPAN and a WLAN. Switching may be performed (330) by a NIC 110, and may be controlled by a firmware 120, and may be switching between communication over a WPAN 150 and communication over a WLAN 160. This switching may allocate traffic to and from computer 170 to and from WPAN 150 via AP 130 and allocate traffic to and from computer 170 to and from WLAN 160 via STA 140. This allocation may be dynamically allocated, and may be in accordance with a standard for bandwidth and/or a standard for time, e.g. TDM.

According to embodiments of the invention, bandwidth may be dynamically allocated, for example, as depicted by the simplified timing diagram 400 of FIG. 4. Reference may be made in terms of time, however it may be understood that time and bandwidth may be related, and mention of time or bandwidth may imply the other. For simplicity, and not to obscure an embodiment of the invention, overhead frames, data, etc. that may be associated with a standard communication protocol have been omitted in the simplified timing diagram 400, and it may be understood that any element of a standard communication protocol that may be required for operation may be implicitly included. Timing diagram 400 may show a depiction of an allocation, for example in accordance with TDM, of access time among a computer 170, a WPAN 150 and a WLAN 160. A beacon interval, as described above, may be from time index T0 (410) to time index T1 (430). A time that may have been determined for computer 170 to access WPAN 150 may be a time from time index T0 (410) to time index T1 (420). A time that may have been determined for computer 170 to access WLAN 160 may be a time from time index T1 (420) to time index T2 (430). Time index T1 (420) may be between time indexes T0 (410) and T2 (430), and times separating time index T1 (420) from time indexes T0 (410) and T2 (430) may be determined from a bandwidth parameter calculated substantially in accordance as above. Time index T1 (420) may be dynamically allocated, and may be moved between time indexes T0 (410) and T2 (430) in accordance with traffic requests and/or responses to and from a WPAN and a WLAN. In some embodiments of the invention, access to a WLAN may occur during a time between time indexes T0 (410) and T1 (420), and access to a WPAN may occur during a time between time indexes T1 (420) and T2 (430). An example of a beacon interval may be 100 milliseconds (ms). A dynamic allocation of bandwidth may be, for example, to allocate 40 ms to WPAN access and 60 ms to WLAN access, of an available 100 ms, in a TDM bandwidth allocation and access scheme, where a division of an available allocation may be determined by a bandwidth parameter. Another example may be to allocate 45 ms to WPAN access and 55 ms to WLAN access, of an available 100 ms, in a TDM bandwidth allocation and access scheme, where a division of an available allocation may be determined by a bandwidth parameter. Other similar allocation examples may occur and may be within a scope of an embodiment of the invention. An allocation may be changed during an operation of an embodiment of the invention, and may be based on changing traffic requests from devices that may be connected, for example as part of WLAN 160 or as part of WPAN 150. Another example may be to first allocate 45 ms to WPAN access and 55 ms to WLAN access, of an available 100 ms, in a TDM bandwidth allocation and access scheme, where a division of an available allocation may be determined by a bandwidth parameter, and then following a change in an access request to then allocate 40 ms to WLAN access and 60 ms to WPAN access, of an available 100 ms, in a TDM bandwidth allocation and access scheme, where a division of an available allocation may be determined by a bandwidth parameter.

In some embodiments of the invention, an AP, for example a light independent AP, for a WPAN device may be provided and a regular STA for a base station subsystem (BSS) may be provided simultaneously. Bandwidth between a light independent AP for WPAN devices and regular STA for BSS may be dynamically allocated and provided simultaneously.

Embodiments of the invention may be implemented at various times during an operation of computer 170 with WPAN 150 and WLAN 160. As traffic demands and/or requests may change during such operation, methods as described herein may be repeated. A repetition of such methods may yield different results for bandwidth allocation parameters, and accordingly different bandwidth allocations. In such embodiments, bandwidth may be dynamically allocated between communication with a WPAN and with a WLAN.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. A method comprising:
receiving at a first access point of a device a first traffic request frame;
sending from a second access point of said device a second traffic request frame;
receiving at said second access point a traffic response frame;
determining a first medium time and a second medium time, the first medium time being based on a first surplus bandwidth allowance, a first packet per second (PPS), and a first medium access control protocol data unit (MPDU) exchange (MPDUExchange) time, which are derived from said first traffic request frame, and the second medium time being based on a second surplus bandwidth allowance, a second PPS, and a second MPDUExchange time, which are derived from said traffic response frame;

deriving a bandwidth allocation parameter from said first medium time and said second medium time; and switching said device between said first access point and said second access point according to said bandwidth allocation parameter.

2. The method of claim 1, further comprising sending said bandwidth allocation parameter to said device.

3. The method of claim 1, wherein said device is a network interface device.

4. The method of claim 3, further comprising switching network access between said first access point and said second access point according to said bandwidth allocation parameter.

5. The method of claim 1, further comprising switching network access between said first access point and said second access point by time division multiplexing.

6. The method of claim 5, wherein said time division multiplexing is according to said bandwidth allocation parameter.

7. The method of claim 1, wherein said first traffic request frame comprises an add transmission stream request.

8. The method of claim 1, wherein said first access point is associated with a wireless personal area network, and said second access point is associated with a wireless local area network.

9. The method of claim 1, wherein said first access point is associated with a wireless local area network, and said second access point is associated with a wireless personal area network.

10. A system comprising:
an access device to be operably connected to a computing device, said access device comprising:
a first network communication device to access a first network; and
a second network communication device to access a second network,
the first network communication device to receive a first frame from the first network, and the second network communication device to receive a second frame from the second network, wherein said access device is to switch said computing device between said first network and said second network according to a bandwidth allocation parameter, said access device to derive said bandwidth allocation parameter from a first medium time and a second medium time, said first medium time being based on a first surplus bandwidth allowance, a first packet per second (PPS), and a first medium access control protocol data unit (MPDU) exchange (MPDUExchange) time, which are derived from said first frame from said first network, and said second medium time being based on a second surplus bandwidth allowance, a second PPS, and a second MPDUExchange time, which are derived from said second frame from said second network.

11. The system of claim 10, wherein said first frame comprises a traffic request frame from said first network, and said second frame comprises a traffic response frame from said second network.

12. The system of claim 10, wherein said access device is to operate according to time division multiplexing.

13. The system of claim 10, wherein said access device is a network interface card.

14. The system of claim 10, wherein said first network is a wireless personal area network, and said second network is a wireless local area network.

15. The system of claim 10, wherein said first network is a wireless local area network, and said second network is a wireless personal area network, the system further including one or more antennas to communicate with said first and second networks.

* * * * *